Figure 1:
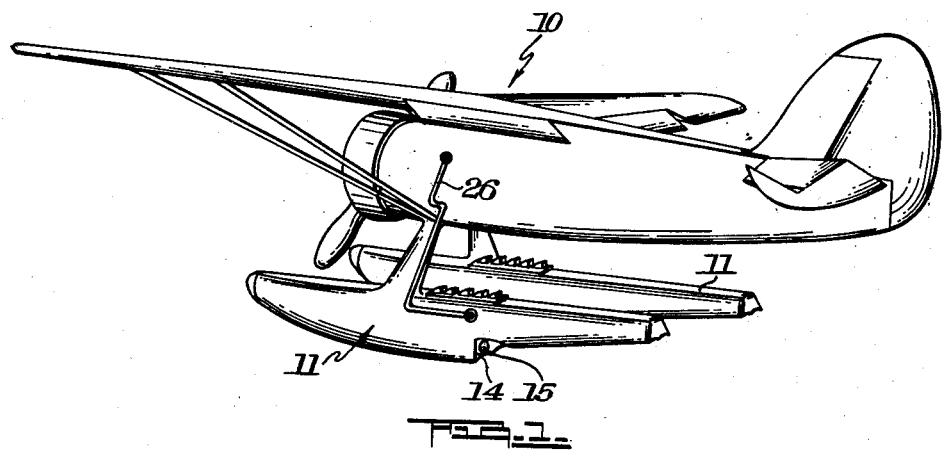

June 16, 1953  C. C. CROSSLEY  2,642,239
FLOAT-EQUIPPED AIRCRAFT

Filed Oct. 8, 1951

2 Sheets-Sheet 1

INVENTOR
CHARLES C. CROSSLEY
BY Fetherstonhaugh & Co.
ATTORNEYS

June 16, 1953
C. C. CROSSLEY
2,642,239
FLOAT-EQUIPPED AIRCRAFT
Filed Oct. 8, 1951
2 Sheets-Sheet 2
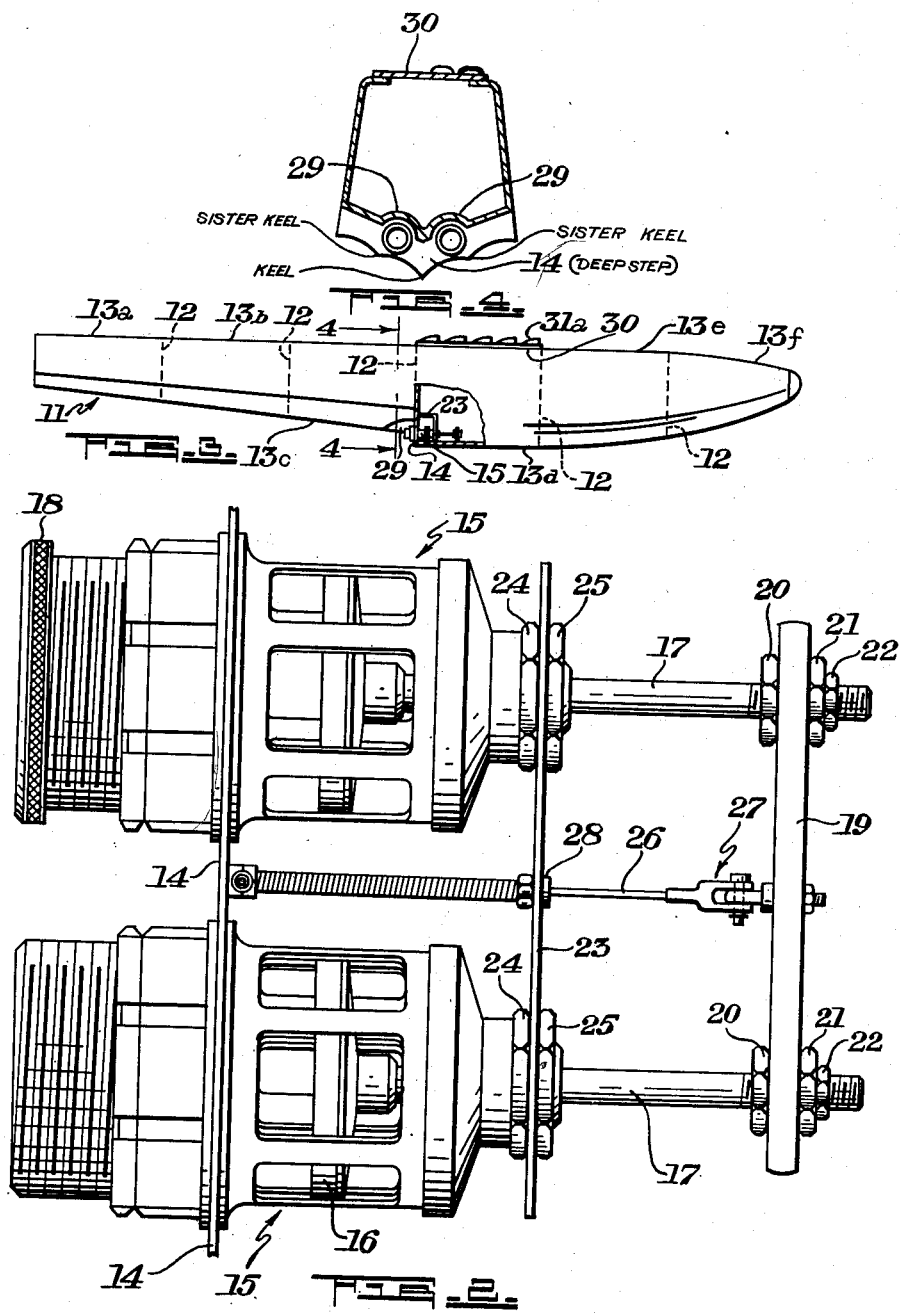
INVENTOR
CHARLES C. CROSSLEY
BY Fetherstonhaugh & Co.
ATTORNEYS Patented June 16, 1953

2,642,239

UNITED STATES PATENT OFFICE 2,642,239

FLOAT-EQUIPPED AIRCRAFT

Charles C. Crossley, Point Edward, Ontario, Canada

Application October 8, 1951, Serial No. 250,229

5 Claims. (Cl. 244—105)

This invention relates to an improved float equipped aircraft.

The main object of the invention is to liven the water to air take-off of float equipped aircraft. Aircraft floats are conventionally subdivided into a plurality of water-tight compartments so that if the float becomes damaged while the aircraft is waterborne, only the compartment in the damaged area will fill with water and the aircraft will not be in the perilous position of having a completely water-filled float. It is also common practice to provide aircraft floats with steps, which, as is well known in this particular art, assist the take-off and landing of the aircraft. Conventionally, this step is a transverse break in the float bottom approximately midway along the float. On either side of the keel proper, and dividing the contour of the forward bottom into two arcs or shallow channels, are two strengthening members called the sister keels. The lower portion of the step between these sister keels will hereinafter be referred to in the specification and claims as the "deep step."

The above-mentioned main object of this invention is accomplished by the provision of one or more controllable valves at the deep step of each float of the aircraft. These valves may be opened or closed from the cockpit of the aircraft by any suitable control means such as a Bowden cable or a push-pull rod. These valves may thus be opened to permit entry of water into the water-tight compartment adjacent the deep step when the aircraft is waterborne, and to permit emission of water therefrom when the aircraft is propelled through the water or is airborne. The valves may be closed from the cockpit to seal the orifices in which they are located.

Float equipped aircraft, which are widely used in the remoter areas of the North American continent for lake-to-lake transport etc., are often called upon to take-off in a heavily loaded condition from a confined take-off area such as a small lake. A quick lively take-off is required under these circumstances. The stepping of aircraft floats greatly minimized the problem presented by confined take-off areas, since the steps served to break the suction which is created by the floats. Without some means to break this suction, while the forward portion of the float bottom rides free by planing action, the rear portion which is below the surface of the water is held down by suction. The provision of the steps in the float is designed to interrupt the flow of water past the float, and, by admitting air at the sides, minimize and finally break the suction. The deep step of the aircraft float, however, sets up its own suction; and this suction, to a considerable degree, retards forward motion, until such time as the float rides sufficiently high for air to be admitted from the sides of the float. Normally, the step may be some six to eight inches below the waterline at the sides, and perhaps some eighteen inches below the water line at the keel. The float must rise at least six inches before there is any possibility of air entering to break the suction. As already mentioned, according to this invention controllable valves are disposed in the deep step of the aircraft. The water-tight compartment adjacent to the deep step is filled to the waterline with water prior to the take-off, and take-off takes place with the valves in the deep step in the open position. As soon as the aircraft begins to move forward across the water, the water in the compartment of each aircraft float commences to leave this compartment via the open valves, and the suction at the deep step is immediately broken by the emission of the water. Practical experiments carried out by the inventor as the pilot of an aircraft equipped with floats as described above, have convinced him that there is a very definite livening of action when an aircraft takes off according to the above-described procedure, as compared to a take-off of the same aircraft under the same conditions but with the valves closed and the compartment empty so that the floats are, in effect, conventional floats.

The floats of the aircraft of this invention have auxiliary uses in addition to the livening of take-off. The compartments adjacent each step of each float may be filled with water prior to take-off and a rather sluggish take-off may be made with the valves closed. The water thus carried into the air may be utilized for drenching bush fires, etc. Furthermore, water may be carried into the air in the manner above described, some insecticide concentrate having been added to the water in the floats, and the valves of the deep step may be partially opened to spray insecticide solution over an insect-infested area.

Furthermore, as will be pointed out more fully hereinafter, the aircraft may take off with water in its floats and fish fry or fingerlings may be carried in the water-filled compartments. By fully opening the valves with the aircraft at low level, lakes and rivers may be conveniently stocked with the fry or fingerlings. Alternatively, the aircraft may be landed on the water which is to be stocked, and the fish may be evacuated from the compartment during a fast taxi of some twenty seconds' duration, with the valves in the open position.

Furthermore, when the aircraft of this invention is beached, with the compartment adjacent to each step of each float flooded, the beached aircraft sits more firmly due to the reduction in buoyancy.

Referring back to the take-off itself, it will be readily appreciated that the presence of water in each float to some extent retards initial movement of the aircraft at the commencement of take-off, so that the engine or engines of the aircraft may gain full revolutions with less forward speed, thus shortening the length of run required for take-off.

To recapitulate, and in order to provide a concise statement of this invention, the improved aircraft will now be defined. This invention generally resides in an aircraft equipped with floats which are subdivided into compartments, conventional steps being provided across the float bottom. One or more orifices are provided in each step. These orifices are positioned in the deep step as low as the structure will permit, and a valve is mounted in each orifice to provide communication between the float exterior and the compartment adjacent to the deep step, when opened, and to block such a communication when closed. A control means operatively connects the said valves with the cockpit of the aircraft so that the valves may be opened to permit entry of water into the said compartment when the aircraft is waterborne and to permit emission of water therefrom when the aircraft is propelled through the water, or is airborne. The control valves may be closed to seal the said orifices in the deep steps of the floats.

Preferably, two valve mounting orifices are located in the deep step of each float, the orifices being symmetrically arranged on each side of the float's center-line. Preferably, the valves in the orifices are of the reciprocating piston type and a yoke rigidly connects the piston rods of the pair of valves in each float. With this arrangement the control means operable from the cockpit is operatively connected to the yoke in any suitable manner which would enable an operator in the cockpit to effect reciprocation of the yoke and thus reciprocate the pistons to open or close each pair of valves.

An embodiment of an aircraft according to this invention is illustrated in the attached drawings.

In these drawings—

Figure 2:
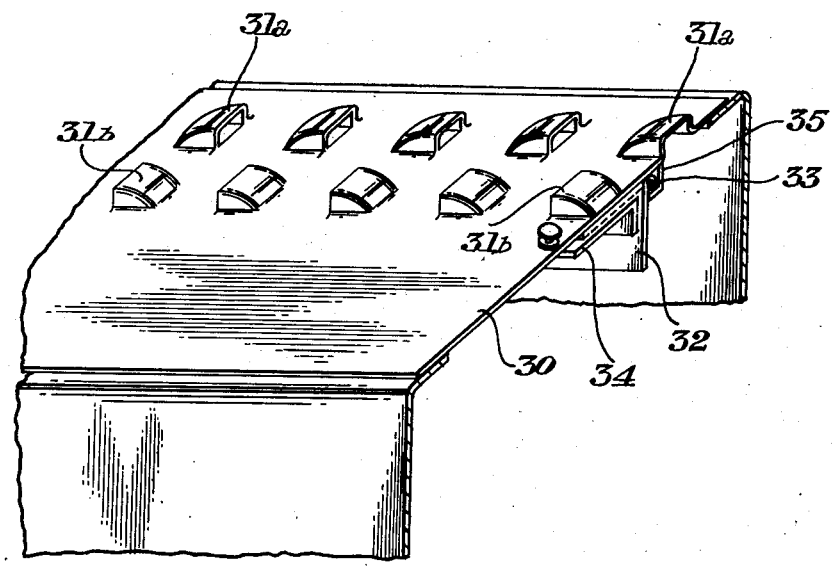

Figure 1 is a perspective view of a float equipped aircraft having valves at the deep step in accordance with this invention, Figure 2 is a top plan view of a pair of valves mounted in the deep step of an aircraft, Figure 3 is a side elevation of the one float of an aircraft according to the invention, the view being partially cross-sectioned so as to illustrate the mounting of one of the valves in the deep step of the float, Figure 4 is a view taken along line 4—4 in Fig. 3, and Figure 5 is a perspective view showing the hatch cover which is located above the compartment of the float adjacent to the deep step i. e. the compartment which fills with water when the aircraft is waterborne and the valves are open.

In the drawings, reference numeral 10 generally indicates an aircraft which is equipped with floats 11. Each float of the aircraft is divided by a number of water-tight bulk-heads 12 (indicated in dotted lines in Figure 3) into a plurality of water-tight compartments 13a, 13b, 13c, 13d, 13e, and 13f. The deep step of each float (as hereinbefore defined) may be noted at 14 in Figures 1, 3, and 4, while the above-mentioned sister keels are best seen in Figure 4. A pair of orifices are located in the deep step 14 of each float, the orifices being symmetrically arranged on either side of a center-line of the float. A valve 15 of the reciprocating piston type is mounted in each orifice. These valves may be of any one of a number of conventional designs and will, therefore, only briefly be described herein. The valve piston 16 is reciprocable by means of a piston rod 17 so as to open or close the valves 15. The valve bodies are rigidly mounted in the orifices of the deep step with the outward ends of the valves projecting rearwardly from the deep step. The outer ends of the valves are externally screw threaded to accommodate a detachable cap, one of which has been indicated at 18 in Figure 2. (The function of this cap will be described later on in this specification.) The main body of each valve 15 as well as the piston rods 17, extend forwardly into the compartment 13d adjacent to the deep step 14. The forward ends of valve piston rods 17 are threaded. A yoke 19 rigidly connects the forward ends of the piston rod 17, the yoke being secured to the rods by means of the nuts 20, 21 and 22 which are carried by the threaded ends of the rods 17. An L-shaped plate 23 (see Figures 2 and 4) is rigidly mounted in compartment 13d, one end of the L being secured to the bulkhead 12 above the deep step 14, and the other end of the L being secured to the base plates of the compartment. The piston rods 17 pass through orifices formed in plate 23, and the forward end of each valve body is secured to L-shaped plate 23 by means of nuts 24 and 25. A push-pull rod 26 extends from the aircraft cockpit to yoke 19, being connected to the latter by a clevis, which has been generally indicated by numeral 27 in Figure 2. The push-pull rod 26 is preferably led from the cockpit via one of the float suspension members, is led through and under the top of the float and down the bulkhead 12 which lies above the deep step 14, the outer casing of the push-pull rod terminating at 28 in L-shaped member 23. (The movable portion of the push-pull rod, of course, continues to meet the clevis 27 which is connected to yoke 19.) An actuating means is provided in the cockpit whereby the pilot may pull or push rod 26, thus reciprocating yoke 19, piston rods 17, and pistons 16, to open and close the valves 15.

It is desirable that the valves 15 should permit quick release of water from the compartment 13d. The valves 15 must, of course, not extend below the forward bottom of the floats 11. It has been found that if the valves are of sufficient diameter to give the desired quick emission of water, a portion of the after bottom of the float should be cut away to accommodate the rearwardly projecting portions of the valves without downward projection of the valves below the level of the forward bottom of the float at a point adjacent the deep step. Therefore, in any case where the valves 15 are of a greater diameter than the depth of the deep step 14 at the points where the valves are mounted, concave domes 29 are provided in the after float bottom (see Figures 3 and 4).

One of the auxiliary uses of the aircraft according to this invention is, as mentioned above, the transportation of fish fry or fingerlings for stocking purposes. Thorough aeration of the water in compartment 13d containing the fish fry or fingerlings is essential if the fish are to arrive at their destination in a live condition. To ensure adequate aeration a plurality of vents has been provided in the hatch cover 30 of compartment 13d. These vents are arranged in two series at the inboard side of the float deck, each series extending generally parallel to the float's center-line. The vents of one series are forwardly cupped and have been numbered 31a. The vents of the other series are rearwardly cupped and have been numbered 31b. When the aircraft is in flight air is caught by the forwardly cupped vents 31a, is directed downwardly into the water in the compartment 13d, and leaves through the rearwardly cupped vents 31b. The continuous flow of air secured in this manner keeps the fish in healthy condition.

Aside from the consideration of aeration of any fish that might be carried in compartment 13d, there should, in any event, be at least one vent in the float deck of each compartment 13d. If no vent were provided, a partial vacuum would be established as water left compartment 13d through the valves 15. This partial vacuum would retard the desired speedy evacuation of compartment 13d during the take-off of the aircraft. When the floats are not being used to transport fish the rearwardly cupped vents 31b become superfluous. As a matter of fact, they would actually become a handicap, if left open since it is desirable to build up air pressure above the water lying in compartment 13d in order to assist in its evacuation when this is desired. This air pressure may be built up by the forwardly cupped vents as the aircraft moves forward with speed. No appreciable amount of pressure can be built up if the rearwardly cupped vents are open. Therefore a rectangular plate 32 has been provided which is hingedly mounted to the underside of the hatch cover 30, as indicated at 33 in Figure 5. A locking means 34 is also connected to the underside of hatch cover 30. This locking means is an L-shaped bar which may be swung to lock plate 32 either in the open position shown in full lines in Figure 5 or in the closed position shown in dotted lines in that figure. When in the dotted line position, plate 34 blocks all the rearwardly cupped vents 31b. The plate 32 is maintained in the open position by locking means 34 jamming the plate against a stop member 35 which is rigidly connected to the underside of hatch cover 30.

The function of the detachable caps 18 mentioned earlier is to externally seal the valves so that the float may be pumped dry for servicing etc. The detachable caps would also be used to keep the aircraft serviceable (as a conventional aircraft), in the event of a possible failure of the valves or their control means. Caps 18 may also be employed to ward off fouling of the valves when the aircraft is beached or has been drawn ashore for maintenance or the like.

To those who may practice this invention in the future, the following recommendations are directed. These recommendations should be borne in mind when selecting and mounting suitable valves.

1. The valves of each float should be similar, similarly mounted, and similarly operable, so that similar performance can be expected from each float.

2. For complete drainage, the valves should be set at the lowest possible points in the float bottom and still not constitute any appreciable break in the desired even contour of the float bottom.

3. To prevent clogging, the valve seat should be as narrow as strength considerations permit, yet still provide a perfect seal.

4. The valves should be self scavenging if fouled with sand, mud or other lake bottom debris due to beaching of the aircraft.

5. The valves should be removable and replaceable as a unit without riveting or bolting to the float structure.

6. Some means for externally sealing of the valves should be provided.

7. The valves should be capable of being quickly fully opened or quickly fully closed by the control means leading from the cockpit.

It should be pointed out that experiments indicate that emission of air, as well as water, through the valves 15 in the deep step 14, may be relied upon to liven the take-off of an aircraft according to this invention. It has been found that if a take-off run is commenced with compartment 13d empty (of water) and valves 15 in a closed position, and the valves 15 are subsequently opened as the aircraft gathers speed along the water, air sweeping in through the vents in the float deck leaves compartment 13d via the valves and destroys the suction which was previously in effect in the area of the deep step 14 of the floats 11.

What I claim as my invention is:

1. In an aircraft equipped with floats, a plurality of water-tight compartments in each float; a deep step (as here-before defined) in each float; two valve mounting orifices extending through the deep step of each float, the orifices being symmetrically arranged on each side of the float's center-line and providing communication between the float exterior and the compartment adjacent the deep step; valves of the reciprocating piston type mounted in the said two orifices of each deep step; a yoke rigidly connecting the piston rods to the pair of valves in each float, the piston in each valve being reciprocable between a position in which it forms a seal closing off the orifice in which the valve is mounted and an open position which permits water to pass through the orifice and enter the compartment adjacent the deep step when the aircraft is waterborne; and valve control means, operable from the aircraft cockpit, and operatively connected to the yokes to effect reciprocation of the yokes and thus reciprocate the pair of pistons associated with each yoke, so that each pair of valves may be simultaneously opened or closed.

2. In an aircraft as defined in claim 1 and in which portions of the valves project rearwardly from the deep step and the valves are of circular transverse cross-section and of a greater diameter than the vertical depth of the deep step at the points where the valves are mounted; concave half domes in the aft float bottom adjacent the deep step, whereby the valves are mountable above the lower edge of the deep step, portions of the valves being received within the recesses formed in the aft float bottom by said half domes.

3. In an aircraft as defined in claim 1 and in which said valves project outwardly and rearwardly from the deep step, detachable caps for externally sealing the projecting valve ends.

4. In an aircraft as defined in claim 1, a plurality of vents in each float communicating with the float compartment adjacent the deep step, said vents being arranged in two series at the inboard side of the float deck, each series extending generally parallel to the float's center-line, the vents of one series being forwardly cupped and those of the other being rearwardly cupped.

5. In an aircraft as defined in claim 4, a plate-like element hingedly mounted at one side of the rearwardly cupped series and swingable to close the rearwardly cupped vents, and means for locking said plate in a vent-closing position.

CHARLES C. CROSSLEY.

References Cited in the file of this patent

UNITED STATES PATENTS

| Number | Name | Date |
|---|---|---|
| 1,157,423 | Ryan | Oct. 19, 1915 |
| 1,396,894 | Stevens | Nov. 15, 1921 |
| 1,746,669 | Mellick | Feb. 11, 1930 |
| 1,812,265 | Hone | June 30, 1931 |
| 1,894,256 | De Ganahl | Jan. 10, 1933 |
| 2,062,384 | White | Dec. 1, 1936 |